United States Patent [19]
Damkjær

[11] Patent Number: 5,697,492
[45] Date of Patent: Dec. 16, 1997

[54] CONVEYOR CHAIN

[75] Inventor: Poul Erik Damkjær, Vinbjergvej 2, Denmark

[73] Assignee: Maskinfabrikken Baeltix A/S, Vejle Ost, Germany

[21] Appl. No.: 428,481

[22] Filed: Apr. 27, 1995

[30] Foreign Application Priority Data

May 3, 1994 [DK] Denmark .................... 0506/94

[51] Int. Cl.$^6$ ........................... B65G 17/06
[52] U.S. Cl. ......................... 198/852; 198/852
[58] Field of Search ............... 198/844.1, 848, 198/850, 851, 852, 853

[56] References Cited

U.S. PATENT DOCUMENTS

| | | | |
|---|---|---|---|
| 2,114,146 | 4/1938 | Klein et al. | 198/182 |
| 4,754,872 | 7/1988 | Damkjaer | 198/852 |
| 5,027,944 | 7/1991 | Damkjaer | 198/831 |
| 5,404,997 | 4/1995 | Schreier et al. | 198/852 X |

FOREIGN PATENT DOCUMENTS

| | | |
|---|---|---|
| 0545398 | 6/1993 | European Pat. Off. . |
| 4312864 | 10/1993 | Germany .................... 198/852 |

*Primary Examiner*—Frank E. Werner
*Attorney, Agent, or Firm*—Antonelli, Terry, Stout & Kraus, LLP

[57] ABSTRACT

Conveyor chain comprising a plurality of identical chain links (1) which are interconnected by means of transversely extending hinge pins through eye parts in the front edge and the rear edge of each chain link, and each chain link is designed with a top plate (2) arranged to support the items to be transported, said top plate being provided with fingers (5) and intermediate recesses (6) for engagement with the fingers and recesses of adjacent chain links. Each chain link comprises at least one cover face (12) at one of the edges (4) of the chain link, said face being situated at a level below the top plate (2) and such that the face may slide under the fingers of an adjacent chain link when the conveyor chain turns. The result is an introduction of "bottoms" in the openings occurring by running in curves with chain links with fingers.

12 Claims, 5 Drawing Sheets

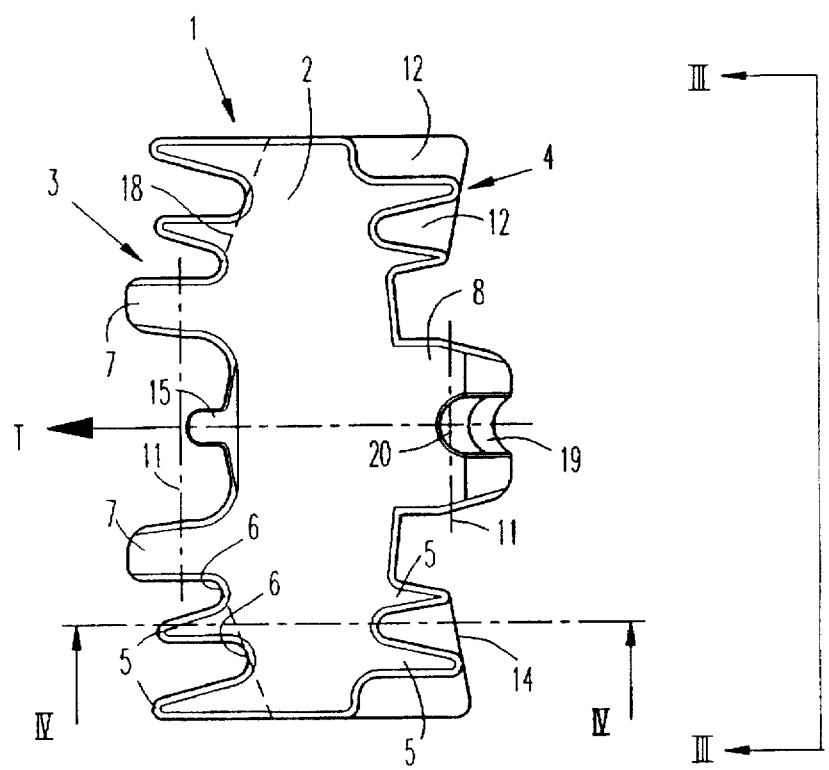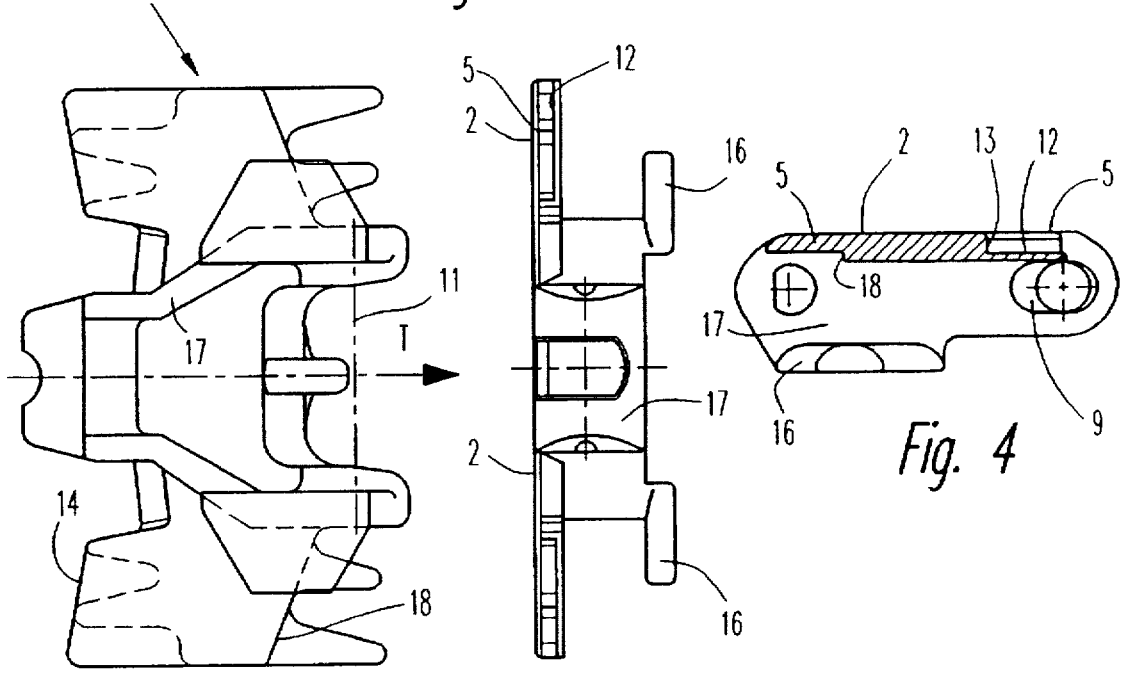
Fig. 1
Fig. 2　　Fig. 3　　Fig. 4

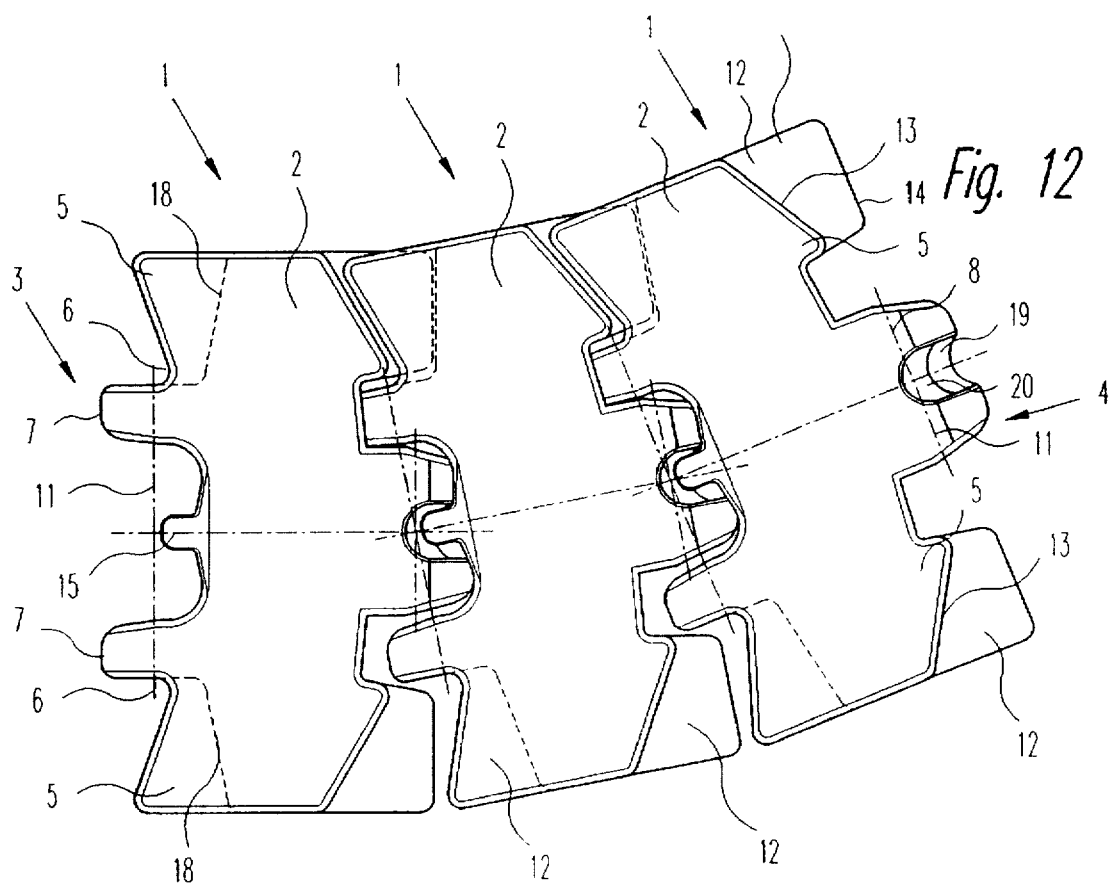
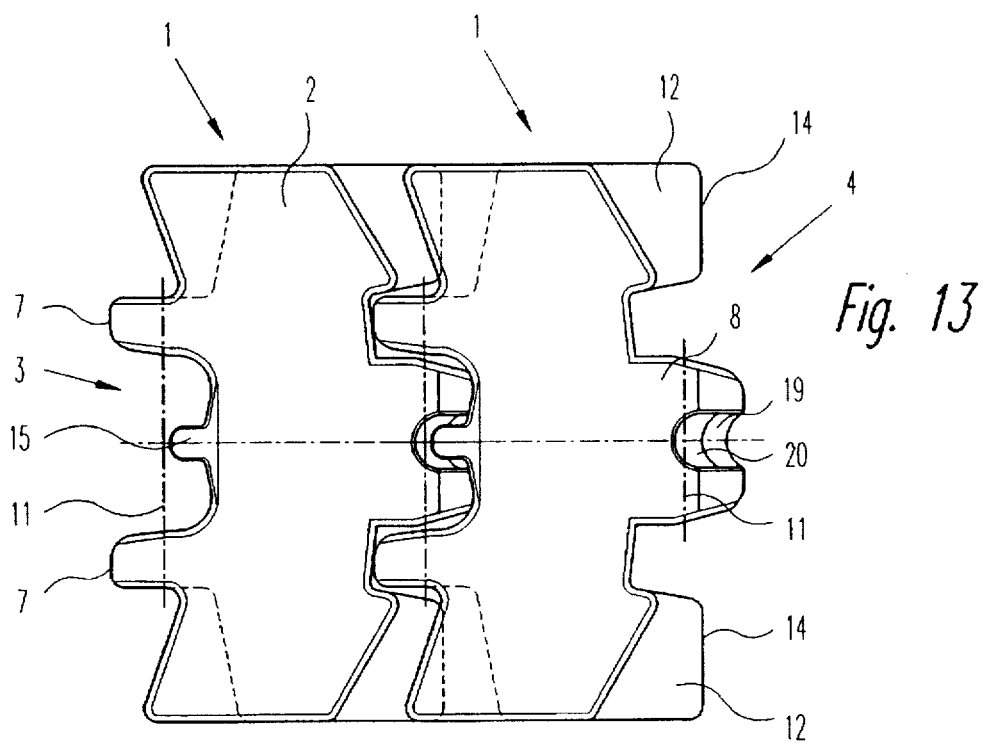

CONVEYOR CHAIN

BACKGROUND OF THE INVENTION

1. Field of the Invention

The invention relates to a conveyor chain comprising a plurality of identical chain links.

2. Description of the Prior Art

The applicant's allowed U.S. patent application Ser. No. 045,188 (Danish Patent Application No. 0523/92) now U.S. Pat. No. 5,307,923 describes chain links with fingers and recesses in the front and rear edges enabling them to be interconnected to form a chain which is swingable and adapted for running in curves and the like, and moreover adapted in such a manner that only small openings will occur in the top surface of the conveyor. In total, the result is a greater planar surface and a smaller non-supporting surface area than in the prior art conveyor chains, which has many advantages. However, in such chain links there still occurs small openings in the support surface of the chain, in particular as regards the chain links situated in a curve, in that openings will occur between the chain links in the outer edge of the curve, the openings being partly or completely closed again when the chain links in question run into a straight-line area again. There is accordingly a risk that protruding parts of the objects resting on the conveyor may get jammed or be damaged when the openings close and a possibility that persons acting in a careless manner may get a finger, pieces of clothing or the like jammed in the openings, which may perhaps cause personal injury.

The applicant's prior U.S. Pat. No. 4,754,872 describes chain links with ribs on the top plate, where the ribs increase in length from the center towards the edges, but in such chain link conveyors there are still comparatively large openings. The support surface in this type of chain link is moreover comprised by upturned rib edges, ie. not a plane top surface.

The applicant's prior U.S. Pat. No. 5,027,944 describes a chain link with arrow-shaped wings and a plane top plate having offset areas which may slide under the wings of the adjacent chain link in order to reduce the size of the openings occurring by running in curves. On the other hand, areas are obtained in the support surface of the top plate which are not in the same plane so that curves will either have to be made with a large radius or conveyors of this kind may only be used for transporting relatively large objects due to the design of the support surface.

SUMMARY OF THE INVENTION

By designing the conveyor chain according to the invention all the advantages of the prior art conveyor chains with fingers, for example of the kind described in U.S. patent application Ser. No. 045,188, are maintained without openings occurring in the top surface, where objects, fingers and the like may be introduced.

By designing the conveyor chain according to the invention there is formed no throughgoing openings in the top surface. The cover face will namely form a bottom in the areas situated between the fingers, ie. in the recesses, and the parts of objects, fingers or the like, which are placed there, will be lifted up again when the individual chain links run from a curved area to a straight-line area. Besides, it will only be possible to introduce objects, fingers etc. between the fingers of the chain links and the few millimetres of space which the cover face is offset relative to the top surface. There is accordingly obtained flex-chain link conveyors without openings in the top surface and with only small areas where the support surface is offset or sunken a few millimetres relative to the top surface.

It will be obvious to a person skilled in the art that the invention may be applied in connection with many different types of chain link and with different designs of the fingers and recesses. A reduction in thickness of the fingers by one edge of each chain link will not reduce the supporting capacity of the chain links since these fingers may rest on the cover face of the adjacent chain link to the extent this may be required.

Chain links for the conveyor according to the invention may be formed in plastic or in steel depending on the application of the chain link conveyor. With these designs there is obtained chain links without extra manufacturing cost so that the chain link conveyor according to the invention, apart from the technical advantages and the advantages in relation to safety, also has economic advantages compared to the prior art chain links.

BRIEF DESCRIPTION OF THE DRAWINGS

Three embodiments of the invention will now be explained further with reference to the drawing, wherein:

FIG. 1 is a top view of a chain link according to a first embodiment;

FIG. 2 is a bottom view of the same chain link;

FIG. 3 is a side view along III—III in FIG. 1 of the same chain link;

FIG. 4 is a plane section of the chain link along IV—IV in FIG. 1,

FIG. 12 is a section of interconnected chain links in a curve according to a third embodiment; and FIG. 13 is two of the chain links in FIG. 12 running in a straight line.

DESCRIPTION OF THE PREFERRED EMBODIMENTS

Figure 5:
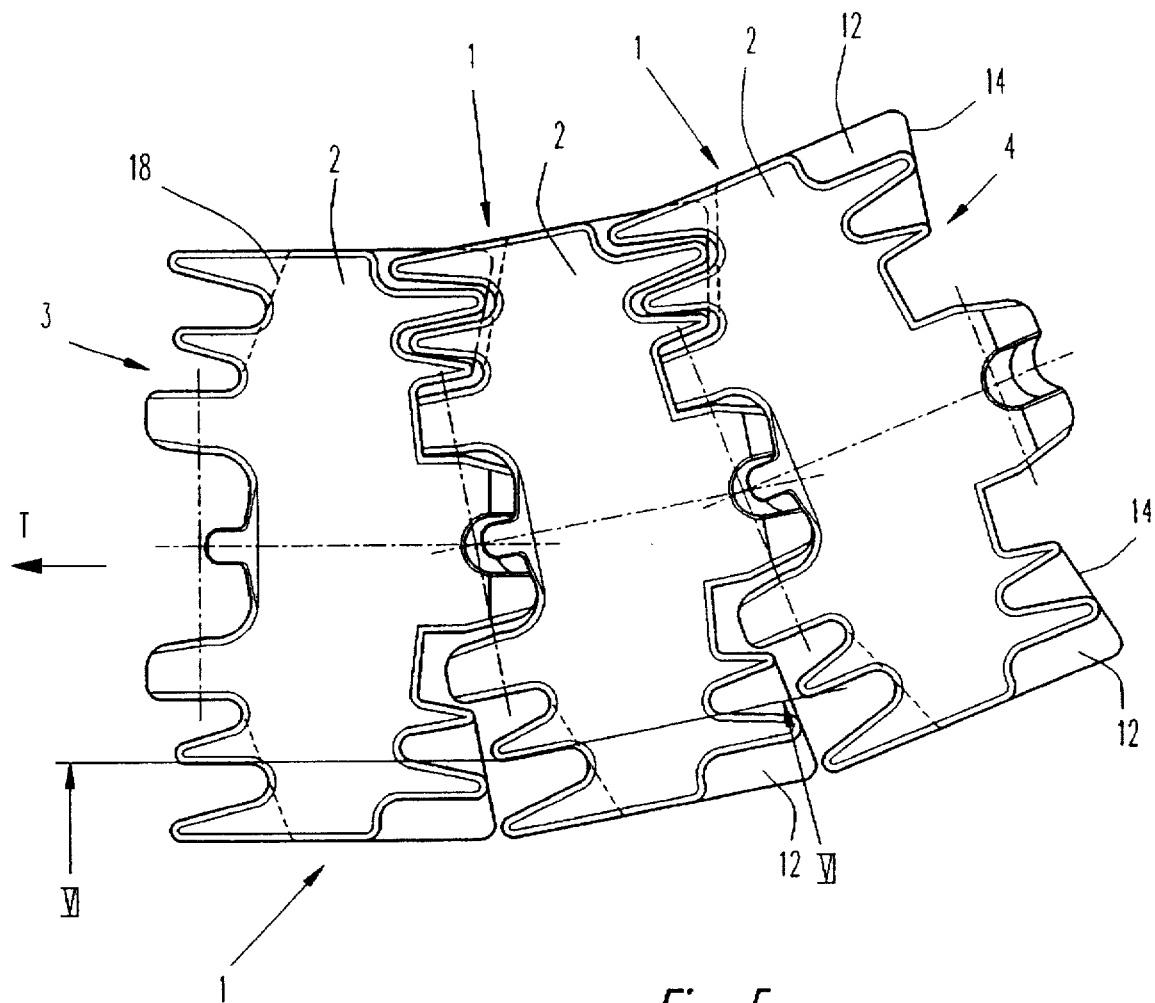
FIG. 5 is a section of interconnected chain links in a curve according to FIG. 1.

In the embodiments shown in the drawing the chain links 1, 1' are moulded in plastic, but as will also appear from the drawing, the chain link 1 shown in FIGS. 1-6 is of quite the same kind as the one described in the applicant's own allowed U.S. patent application Ser. No. 045,188 relating to chain links of plastic as well as chain links of steel. It will therefore be obvious to a person skilled in the art and appear from the following explanation that the present invention may be carried out in the form of plastic chain links as well as steel chain links for forming endless conveyor chains. The two embodiments have therefore been included to illustrate that the invention may be carried out in connection with any type of conveyor chains with a top plate with fingers for achieving the desired technical effect.

Each chain link 1, 1' comprises a front edge 3, 3' and a rear edge 4, 4' when the running direction is as shown by the arrow T showing the preferred running direction, but there is of course nothing to prevent the chain links according to the invention from running in the opposite direction. Each chain link 1, 1' has eye parts 7, 7' by the front edge 3, 3' adapted to secure a hinge pin 10, 10' with a centre axis 11, 11', and arranged in a manner known per se to enter into engagement with a transverse opening 9, 9' in the eye part 8, 8' of the adjacent chain link in the rear edge 4, 4' of the adjacent chain link. The transverse opening 9, 9' in the eye part 8, 8' may for example be designed with an increasing clearance from the longitudinal center line of the chain link as shown in FIG. 7, but may also be designed in other manners, for example in the form of a known, built-in cardan joint.

Figure 7:
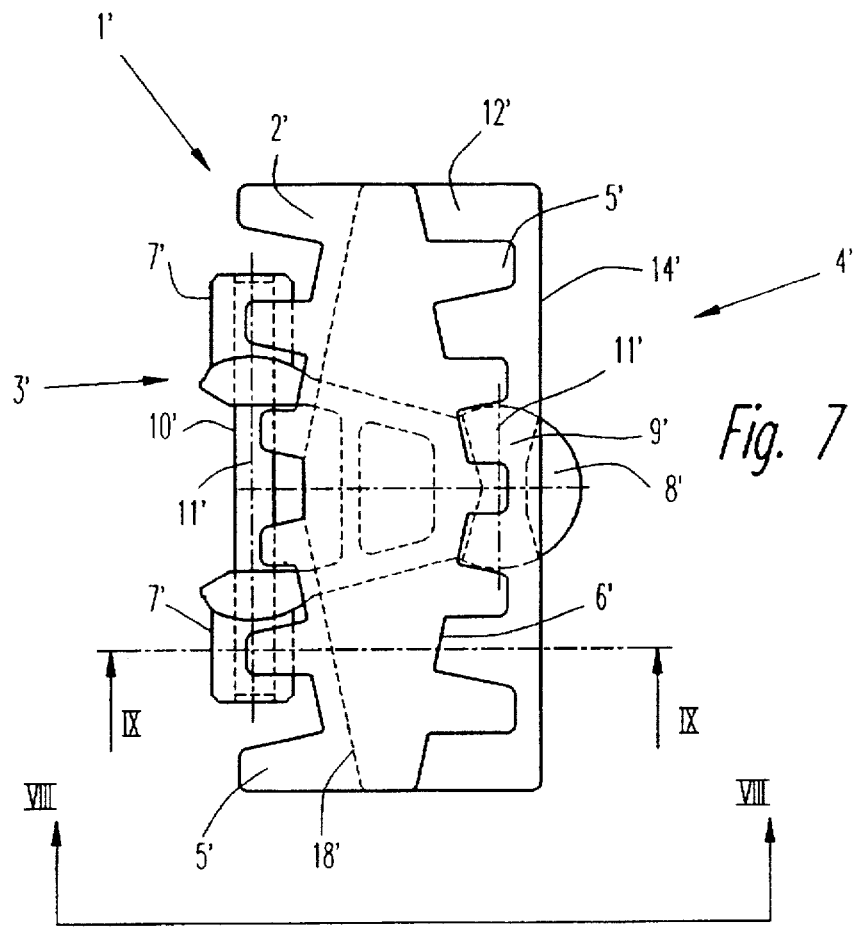
FIG. 7 is a top view of a chain link according to the invention according to a second embodiment.
Figure 8:
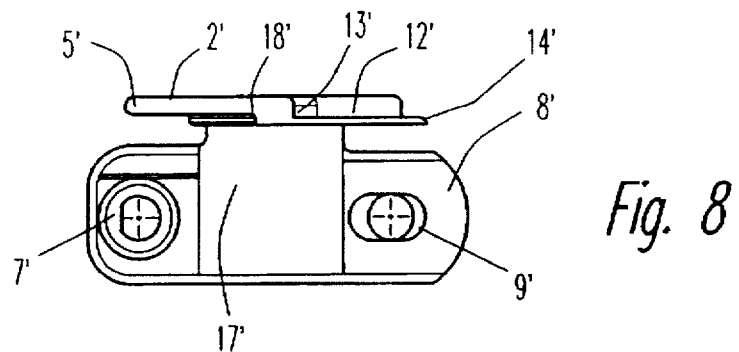
FIG. 8 is a side view along VIII—VIII in FIG. 7.
Figure 9:
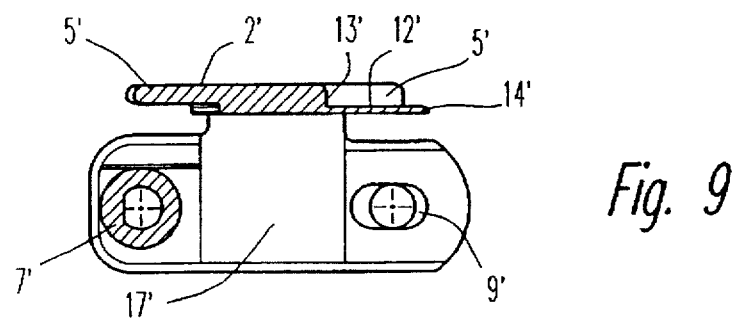
FIG. 9 is a plane section along IX—IX in FIG. 7.

Chain links of the shown kind moreover comprise a central lower part 17, which supports a top plate 2, 2' for supporting the objects to be transported, and underlying fins 16, see FIG. 3, or hinge eyes 7', see FIGS. 7-9, arranged in such a manner that the conveyor chain may be retained in engagement with the track controlling the chain, if required.

Figure 10:
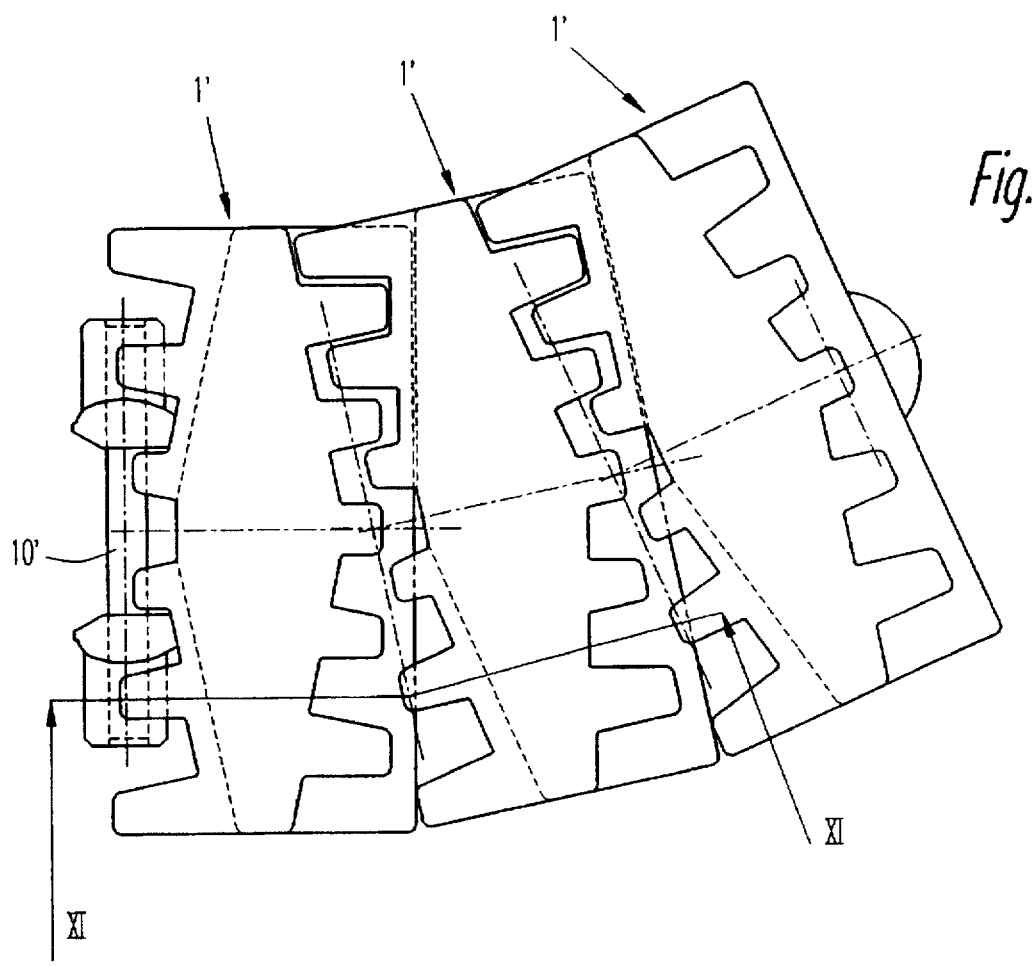
FIG. 10 is a section of interconnected chain links in a curve according to FIG. 7.

The top plate 2, 2' of the chain links has fingers 5, 5' and recesses 6, 6', so that adjacent chain links 1, 1' may engage each other as shown in FIGS. 5 and 10. The type of chain link 1 in FIGS. 1-6 moreover has a central finger 15 for engagement with a central recess 19 with a notch 20 in the adjacent chain link for reducing openings in the top plate, and moreover as explained in the applicant's own above-mentioned U.S. patent application.

However, it clearly appears from FIGS. 5 and 10 that despite fingers and recesses the conveyor chain opens somewhat at the outer edge of a curve with the risk that small objects or parts of objects or a finger or loose pieces of personal clothing etc. may inadvertently be introduced into the openings created, and get jammed if not removed before the conveyor reaches a straight-line area, where the openings are closed. To avoid this, the chain links according to the invention are provided with a cover face 12, preferably at either side by one of the edges of the chain link; in the example shown by the rear edge 4, 4' of the chain link. The cover faces 12, 12' are substantially plane faces, which are moulded or die-stamped integrally with the chain link itself. If the chain links are produced by sintering, the cover faces are made while forming and sintering the remaining part of each chain link. Preferably, the cover faces 12, 12' completely cover the openings in the chain links resulting from the recesses 6, 6', i.e. the area between the fingers 5, but may also, as shown in FIG. 10, cover a larger area.

The result is the introduction of a "bottom" in the openings occurring by running in curves with chain links of that kind. The cover 12, 12' is offset a few millimetres, for example by an offset 13, 13' of a few millimetres, and the cover 12, 12' accordingly provides a substantially plane area of material as mentioned above. This will prevent objects, fingers etc. to be introduced into the openings occurring between the fingers and the recesses by running in curves, and should this nevertheless happen, then the objects or the fingers may only be introduced a few millimetres whereupon they will hit against the cover face 12, 12'. When the chain links run from an area with a curve to a straight-line area, the openings between the fingers and the recesses will close, and any objects introduced into the openings will be lifted up onto the top surface of the chain link again without being damaged. It will also appear from the drawing that the fingers 5, 5' of the chain links have rounded edges, thereby completely preventing objects, fingers etc. from getting jammed.

The cover faces 12, 12' shown in the drawing terminate in a straight edge 14, 14', which is either designed as shown in FIG. 1 with two cover faces 12, one at either side of the chain link, or, as shown in FIG. 7, with one common transverse cover face 12' extending across the entire chain link, but there is of course nothing to prevent the edge 14, 14' from having any other shape. However, it is of major importance to the possibility of the chain links running freely in curves that there is room for the cover face/faces 12, 12'. Therefore, the shown designs of the edge 14, 14' are advantageous in many structures. In order to make room for the cover face 12, 12', the fingers 5, 5' by the opposite edge of the chain link have been made a little thinner, for example by a small offset 18, 18' from the lower side, see for example FIGS. 4, 6, 8 and 11.

Figure 6:
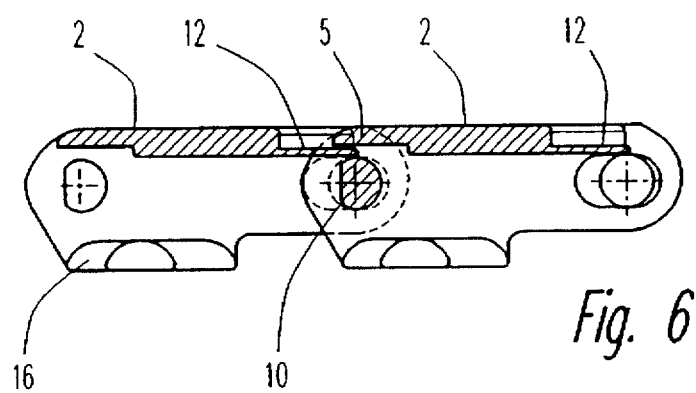
FIG. 6 is a section VI—VI of the chain in FIG. 5 running in a straight line.
Figure 11:
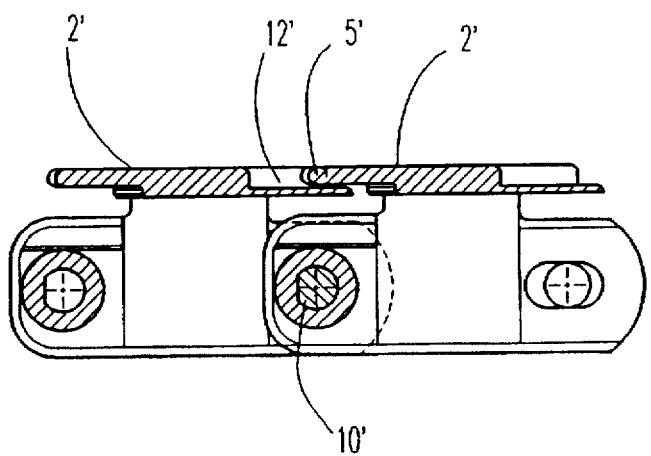
FIG. 11 is a section XI—XI of the chain in FIG. 10 running in a straight line.

It moreover appears from FIG. 6 and FIG. 11 of the drawing that the fingers 5, 5' may rest on the cover face 12, 12' of the adjacent chain link at least during straight-line running and, dependent on the design and the size of the cover face or faces, also when the chain links are in a curve.

FIGS. 12-13 show an embodiment of the invention corresponding to the type shown in FIGS. 1-6, but wherein fingers 5 and recesses 6 almost join so that there is practically only one finger 5 and one recess 6 at either side of each chain link, and so that under the top plate 2 there is room for the cover face 12 of the adjacent chain link. Moreover, the chain links operate as explained above, and in FIGS. 12 and 13 the same reference numerals as used in FIGS. 1-6 for equal or similar parts have been used. It furthermore clearly appears from FIG. 13 that the conveyor chain has an unbroken top plate by straight-line running and that by running in curves, as shown in FIG. 12, the chain gets only quite small and slit-like openings in that the vast majority of the openings, which arise, are covered by the cover face 12.

I claim:

1. A conveyor chain comprising:

a plurality of identical chain links which are connected by transversely extending hinge pins inserted through eye parts at a front edge and a rear edge, respectively, of adjacent chain links enabling pairs of the connected links to be mutually swingable, with the front edge of each chain link having two eye parts for securing a hinge pin and with the rear edge having an eye part with a transversely extending opening for receiving the hinge pin of an adjacent chain link, and wherein each chain link comprises a top plate for supporting items to be transported, the top plate having fingers and intermediate recesses between adjacent fingers extending from the front edge and rear edge of each chain link for engagement with corresponding fingers and recesses of adjacent chain links, a cover face located at the rear edges of the chain link, situated at a level below the top plate, permitting the cover face to slide under the fingers of the front edge of the adjacent chain link when the conveyor chain turns;

the cover faces of each chain link having a substantially planar face and extending to substantially cover the recesses between the fingers; and a thickness of the fingers at the front edge of each link being reduced on an underside relative to a thickness of an adjacent top plate.

2. A conveyor chain according to claim 1 wherein each chain link is formed as an integrally moulded plastic unit with the cover faces integrally moulded therein.

3. A conveyor in accordance with claim 2 further comprising:

means for forcing items contacting the cover face upward upon closing of openings between the fingers of adjacent hinge links upon turning of the conveyor chain from a curved configuration to a straight configuration.

4. A conveyor in accordance with claim 3 wherein:

the means for forcing comprises the cover face and edges of the fingers.

5. A conveyor in accordance with claim 4 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

6. A conveyor in accordance with claim 3 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

7. A conveyor in accordance with claim 2 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

8. A conveyor in accordance with claim 1 further comprising:

means for forcing items contacting the cover face upward upon closing of openings between the fingers of adjacent hinge links upon turning of the conveyor chain from a curved configuration to a straight configuration.

9. A conveyor in accordance with claim 8 wherein:

the means for forcing comprises the cover face and edges of the fingers.

10. A conveyor in accordance with claim 9 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

11. A conveyor in accordance with claim 8 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

12. A conveyor in accordance with claim 1 wherein:

a maximum extension of the fingers along the rear edge of each chain link is equal to or less than a maximum extension of the cover face along the rear edge and a maximum extension of the cover face located closest to each side of the chain link extends beyond the finger located closest to the edge of each side in directions both parallel to and perpendicular to a direction of straight line travel of the conveyor chain.

\* \* \* \* \*

UNITED STATES PATENT AND TRADEMARK OFFICE
CERTIFICATE OF CORRECTION

PATENT NO. : 5,697,492
DATED : December 16, 1997
INVENTOR(S) : Poul Erik DAMKJAER It is certified that error appears in the above-identified patent and that said Letters Patent is hereby corrected as shown below:

On the title page, item [73] Assignee;

delete "Germany" and insert therefor --Denmark--.

Signed and Sealed this

Nineteenth Day of May, 1998

*Attest:*

BRUCE LEHMAN

*Attesting Officer*  *Commissioner of Patents and Trademarks*